(12) United States Patent
Noblet et al.

(10) Patent No.: US 8,165,337 B2
(45) Date of Patent: Apr. 24, 2012

(54) PROCEDURE AND DEVICE FOR DETECTING FADES IN A SEQUENCE OF IMAGES

(76) Inventors: Ludovic Noblet, Betton (FR); Eric Mercier, Rennes (FR); Michel Jouan, Saint Aubin du Cormier (FR)

( * ) Notice: Subject to any disclaimer, the term of this patent is extended or adjusted under 35 U.S.C. 154(b) by 659 days.

(21) Appl. No.: 11/922,439

(22) PCT Filed: Jun. 20, 2006

(86) PCT No.: PCT/EP2006/063328
§ 371 (c)(1),
(2), (4) Date: Dec. 9, 2008

(87) PCT Pub. No.: WO2006/136544
PCT Pub. Date: Dec. 28, 2006

(65) Prior Publication Data
US 2009/0129687 A1    May 21, 2009

(30) Foreign Application Priority Data
Jun. 23, 2005 (FR) ..................................... 05 51728

(51) Int. Cl.
*G06K 9/00* (2006.01)
*H04N 9/64* (2006.01)
(52) U.S. Cl. .................. 382/100; 382/255; 348/700
(58) Field of Classification Search .................. 382/100,
382/103, 106, 107, 151, 162, 168, 172, 173,
382/181, 194, 199, 209, 219, 220, 232, 254,
382/255, 274, 275, 276, 291, 305, 312; 375/240.24,
375/240.12; 348/700, 722; 386/251
See application file for complete search history.

(56) References Cited

U.S. PATENT DOCUMENTS

| 5,920,360 | A | * | 7/1999 | Coleman, Jr. | 348/700 |
| 6,052,417 | A | | 4/2000 | Fujiwara et al. | |
| 6,084,641 | A | * | 7/2000 | Wu | 348/722 |
| 6,459,459 | B1 | * | 10/2002 | Ratakonda | 348/700 |
| 6,459,733 | B1 | | 10/2002 | Yokoyama | |
| 6,606,409 | B2 | * | 8/2003 | Warnick et al. | 382/173 |

(Continued)

FOREIGN PATENT DOCUMENTS
CN      1137724 A    12/1998
(Continued)

OTHER PUBLICATIONS

R.M. Ford et al.: "Metrics for shot boundary detection in digital video sequences" Multimedia Systems, NY,USA vol. 8, No. 1, Jan. 2000, pp. 37-46.

(Continued)

*Primary Examiner* — Seyed Azarian

(57) ABSTRACT

The invention relates to a method for detecting a fade in a sequence of images which comprises the following steps:
calculating, for each of the images of a window N consecutive images in length, termed the detection window, and for the image preceding the detection window, a luminance level on the basis of the luminance values associated with each of the pixels of each of the images;
calculating, for each of the N images of the detection window, a difference of luminance level between the luminance level of the current image and the luminance level of the image preceding the current image; and
deducing therefrom the presence of a fade for the detection window if, for at least k images of the detection window, said difference of luminance level is greater that a predefined threshold, with $2 \leq k \leq N$.

8 Claims, 3 Drawing Sheets

U.S. PATENT DOCUMENTS

Figure 1:
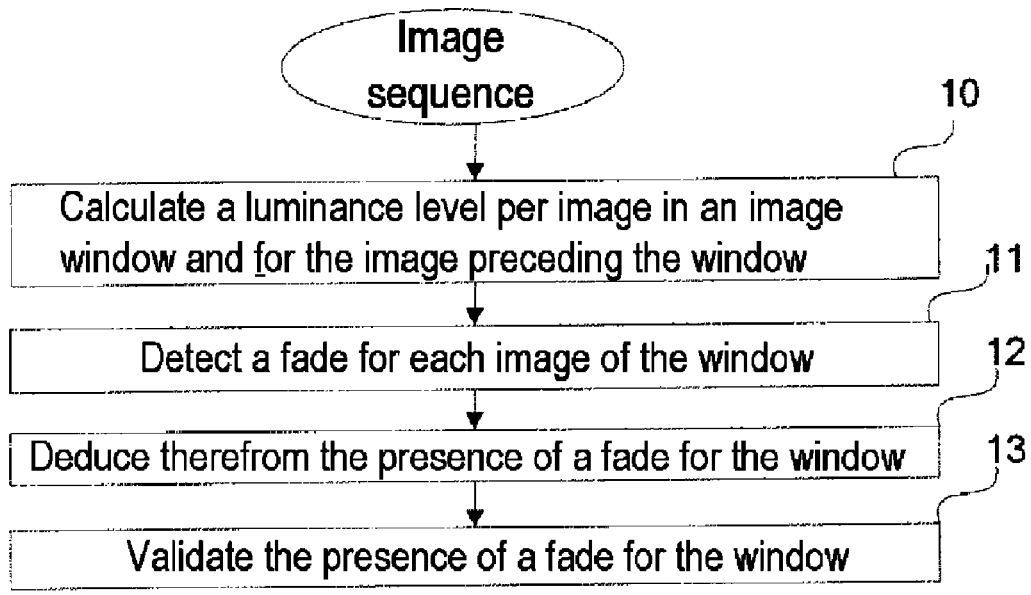

| | | | |
|---|---|---|---|
| 6,625,214 B1 * | 9/2003 | Umehara et al. | 375/240.12 |
| 7,298,962 B2 * | 11/2007 | Quan et al. | 386/251 |
| 7,949,051 B2 * | 5/2011 | Yankilevich | 375/240.24 |
| 2001/0026641 A1 | 10/2001 | Kimura | |

FOREIGN PATENT DOCUMENTS

| | | |
|---|---|---|
| EP | 0710031 A2 | 1/1996 |
| JP | 10304374 | 11/1998 |
| JP | 2000059775 | 2/2000 |
| JP | 2001292372 | 10/2000 |
| JP | 2002051341 | 2/2002 |

OTHER PUBLICATIONS

B-L Yeo et al.: "Rapid Scene Analysis on Compressed Vodeo" IEEE Transations on Circuits and Systems for Video Technology, IEEE Service Center, Piscataway,NJ, vol. 5, No. 6, Dec. 1, 1995, pp. 533-544.

Bitian, Yang, et. al., "A Fade-In and Fade-Out Detection Method". Computer Science & Technology Department, USTC, Hefei 230027, pp. 92-94.

Corridoni, J.M. et al., "Automatic Video Segmentation Through Editing Analysis", Proceedings of The 8th Int. Conf. on Image Analysis and Processing, lines 11-13 on p. 182. Dipartimento Di Sistemi E Informatica, Universita Degli Studi Di Firenze, VIA S. Marta 3, 50139 Firenze, Italy.

R.M. Ford at al.: "Metrics for shot boundary detection in digital video sequences" Multimedia Systems, NY, USA vol. 8, No. 1, Jan. 2000, pp. 37-46.

B-L Yeo et al.: "Rapid Scene Analysis on Compressed Vodeo" IEEE Transations on Circuits and Systems for Video Technology, IEEE Service Center, Piscataway, NJ, vol. 5, No. 6, Dec. 1, 1995, pp. 533-544.

J. Bescos: "Real-Time Shot Change Detection Over Online MPEG-2 Video" IEEE Transations on Circuits and Systems for Video Technology, IEEE Service Center, Piscataway, NJ US, vol. 14, No. 4, Apr. 2004, pp. 475-484.

S. Lefevre et al: "A review of real-time segmentation of uncompressed video sequences for content-based search and retrieval", Feb. 2003, Real-Time Imaging, Academic Press Limited, GB, pp. 73-98.

B. Furht et al: "Technique for detection of editing effects" Handbook of Video Databases, Design and Applications, CRC Press, US 2004, pp. 156-176.

Search Report Dated Jun. 15, 2007.

Bitian, Yang, et. al, "A Fade-In and Fade-Out Detection Method". Computer Science & Technology Department. USTC, Hefei 230027, pp. 92-94.

Corridoni, J.M. et al., "Automatic Video Segmentation Through Editing Analysis". Proceedings of the 8th Int.Conf. on Image Analysis and Processing, lines 11-13 on p. 182. Dipartimento di Sistemi e Informatica, Universita Degli Studi di Firenze, via S. Marta 3, Firenze, Italy.

* cited by examiner

PROCEDURE AND DEVICE FOR DETECTING FADES IN A SEQUENCE OF IMAGES

This application claims the benefit, under 35 U.S.C. §365 of International Application PCT/EP2006/063328, filed Jun. 20, 2006, which was published in accordance with PCT Article 21(2) on Dec. 28, 2006 in English and which claims the benefit of French patent application No. 0551728, filed Jun. 23, 2005.

1. FIELD OF THE INVENTION

The invention relates to a device and a procedure for detecting fades in a sequence of images.

2. STATE OF THE ART

In the field of image processing (e.g. compression, content enhancement), the methods applied to image sequences, for example to estimate a motion between two images or else to temporally filter the images of the sequence, often require temporal tracking of the information. But a break in temporal continuity in a sequence of images disrupts the implementation of these methods. This more or less sharp break corresponds to a more or less significant modification (e.g. transition) of the content between two successive images. Its identification is necessary so as to take account of this discontinuity during the application of these methods and thus improve their robustness.

More particularly, a shot or sequence shot is an uninterrupted sequence of images filmed by a camera or a camcorder in a single picture capture. This shot is the basic unit used to analyse or construct a video content. A video sequence generally comprises a succession of shots interconnected with the aid of video editing procedures. These procedures in particular make it possible to create an abrupt transition between two shots or else a progressive transition according to which an image is progressively changed into another image by mixing of the two images (e.g. a fade). The detection of these transitions makes it possible in the case of an image sequence coding application to improve the coding quality by taking account of these transitions in the choices (for example structure of a group of images or "GOP") made by the coder. This detection also makes it possible to retrieve the shot boundaries and narrative units so as in particular to allow non-linear navigation around the content.

3. SUMMARY OF THE INVENTION

The invention is aimed at detecting progressive transitions, more particularly fades, in a sequence of images.

The invention relates to a method for detecting a fade in a sequence of images comprising pixels or image points with each of which is associated at least one luminance value. It comprises the following steps:
  calculating (10), for each of the images of a window N consecutive images in length, termed the detection window, and for the image preceding the detection window, a luminance level on the basis of the luminance values associated with each of the pixels of each of the images;
  detecting (11) a fade, for each of the N images of the detection window, based on the difference between the luminance level associated with the current image and the luminance level associated with the image preceding the current image; and
  deducing therefrom (12) the presence of a fade for the detection window if, for at least k images of the detection window, a fade has been detected, with $2 \leq k \leq N$.

Preferably, the luminance level associated with an image is equal to the sum of the luminance values associated with each of the pixels of the image.

Advantageously, the method furthermore comprises an additional step for validating the presence of a fade in the detection window if a level of motion associated with the detection window is less than a predetermined threshold.

Preferably, the level of motion associated with the current image is equal to the ratio between the temporal activity calculated between the current image and the image preceding the current image, termed the preceding image, and the spatial activity calculated for the current image. Moreover, the level of motion associated with the decision window is equal to the level of motion associated with the last image of the decision window.

Preferably, the temporal activity between the image and the preceding image is equal to the sum of the absolute values of the pixel-wise differences between the luminance values associated with each pixel of the image and the luminance values associated with each pixel of the preceding image. Furthermore, the spatial activity of the image is equal to the sum of the absolute values of the luminance values associated with each pixel of the image.

The invention also relates to a device for detecting fades in a sequence of images comprising pixels or image points with each of which is associated at least one luminance value. It comprises:
  means (32, 33, 34) of calculation for calculating, for each of the images of a window N consecutive images in length, termed the detection window, and for the image preceding the detection window, a luminance level on the basis of the luminance values associated with each of the pixels of each of the images;
  means (32, 33, 34) of detection for detecting a fade, for each of the N images of the detection window, based on the difference between the luminance level associated with the current image and the luminance level associated with the image preceding the current image; and
  means for deducing (32, 33, 34) the presence of a fade for the detection window if for at least k images of the detection window a fade has been detected by the detection means, with $2 \leq k \leq N$.

The invention relates furthermore to a video coding device which comprises coding means and a device for detecting fades according to the invention.

The invention relates moreover to a device for structuring a sequence of images characterized in that it comprises indexation means and a device for detecting fades according to the invention.

4. LISTS OF FIGURES

Figure 2:
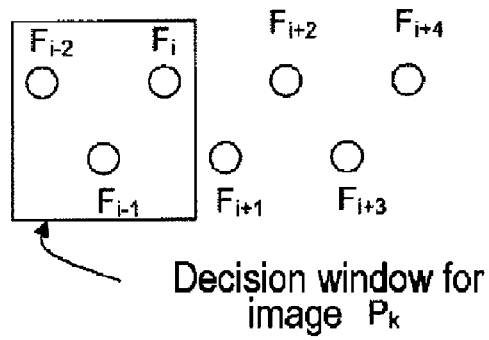
Figure 3:
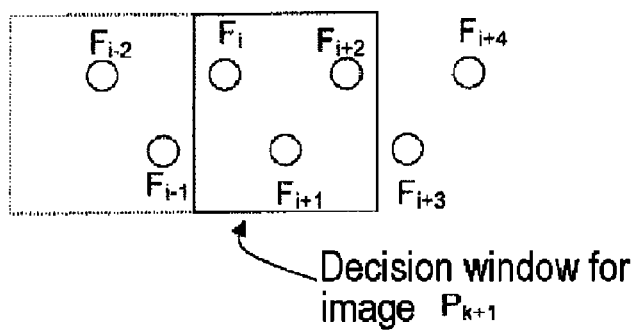
Figure 4:
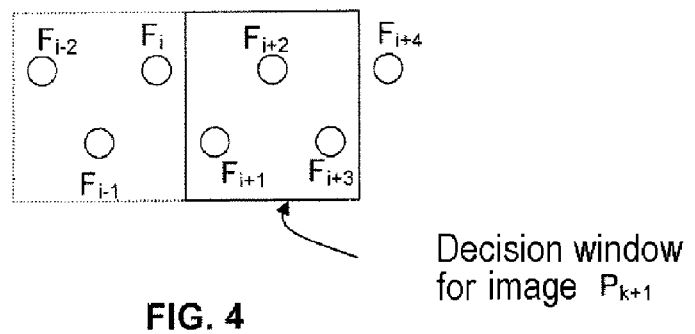
Figure 5:
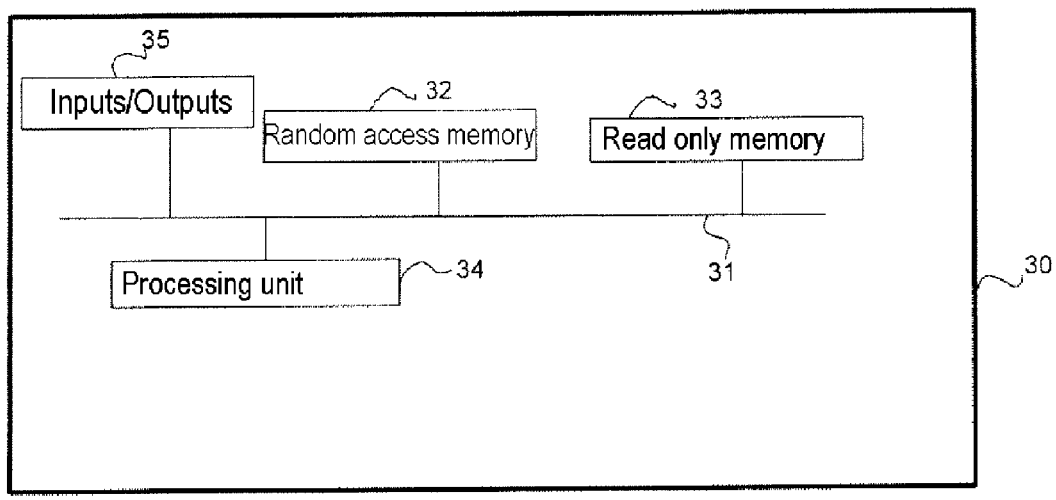
Figure 6:
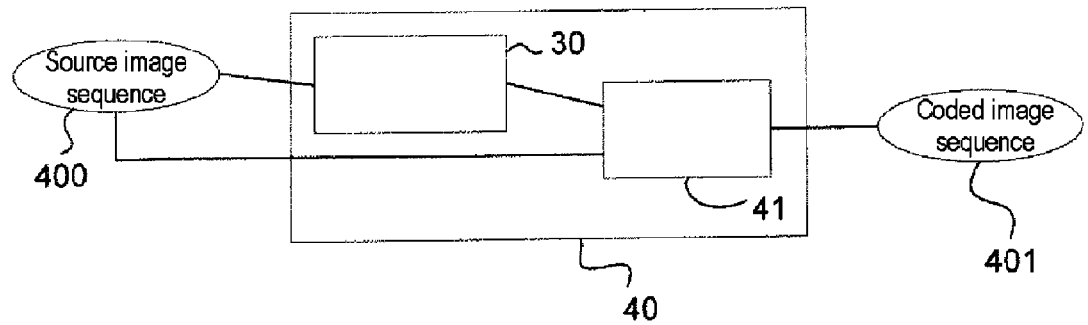
Figure 7:
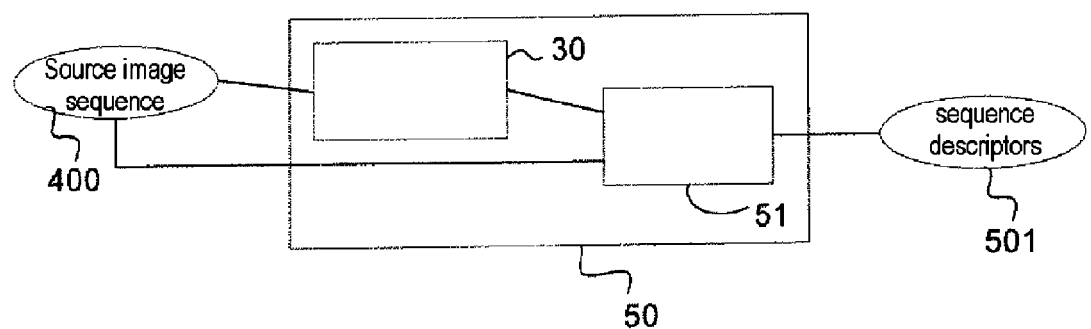

The invention will be better understood and illustrated by means of wholly non-limiting advantageous exemplary embodiments and modes of implementation with reference to the appended figures in which:
  FIG. 1 illustrates a method for detecting fades according to the invention;
  FIG. 2 illustrates a position of a decision window;
  FIG. 3 illustrates a displacement of a decision window;
  FIG. 4 illustrates another displacement of a decision window;
  FIG. 5 illustrates a device according to the invention;

FIG. 6 illustrates an image sequence coding device according to the invention; and FIG. 7 illustrates an image sequence structuring device according to the invention.

5. DETAILED DESCRIPTION OF THE INVENTION

The invention is aimed at detecting fades in a sequence of images, the sequence being progressive or interlaced, each image comprising pixels with each of which is associated in particular a luminance value. In the case of interlaced sequences, each image comprises an even field and an odd field. Each field itself comprises pixels or image points with each of which is associated in particular a luminance value. Considering a sequence of images and a sequence of images f (for example a sequence of black or nearly uniform images), a fade from f to s is called a fade-in and vice versa a fade from s to f is called a fade-out. The sequence of images comprising the fade from s to f or from f to s is defined as follows:

$$e(x,y,n)=(1-x(n))\cdot s(x,y,n)+x(n)\cdot f(x,y,n)$$

where:
x(n) is the fade factor,
n is the index of the image in the sequence, and
(x,y) are the coordinates of the pixels in the image.

The factor x(n) is homogeneous inside an image or frame (i.e. independent of x and y) and lies between 0 and 1. We define the luminance level $L_e(n)$ for a given image or frame n in the following manner:

$$L_e(n) = \sum_{x=0}^{X}\sum_{y=0}^{Y} e(x,y,n) = \sum_{x=0}^{X}\sum_{y=0}^{Y} [(1-x(n))*s(x,y,n)+x(n)f(x,y,n)]$$

It follows that $$L_e(n) = (1-x(n))\sum_{x=0}^{X}\sum_{y=0}^{Y} s(x,y,n) + x(n)\sum_{x=0}^{X}\sum_{y=0}^{Y} f(x,y,n)$$

and therefore that $L_e(n)=(1-x(n))*L_s(n)+x(n)L_f(n)$. By assuming that the image f(x,y,n) is homogeneous, has a luminance level equal to $L_f$ and that $L_f(n)=L_f(n+1)$, then the difference between the luminance level associated with image or frame n and the luminance level associated with image or frame n+1 is equal to:

$$L_e(n+1)-L_e(n)=(1-x(n+1))*L_s(n+1)-(1-x(n))*L_s(n)+(x(n+1)-x(n))L_f$$

Considering that: $L_s(n+1)-L_s(n)=\Delta L_s(n+1)$, the luminance difference is then equal to:

$$L_e(n+1)-L_e(n)=\Delta L_s(n+1)*(1-x(n))-(x(n+1)-x(n))*(L_s(n+1)-L_f)$$

If the fade factor x(n) is linear for a fade which lasts N images or frames from an image (or frame) of index 0 to an image (or frame) of index N then x(n) is split up in the following manner:

$$x(n) = k_1 + k_2 \frac{n}{N}$$

$k_1$ and $k_2$ are two coefficients making it possible to express the linear nature of the fading factor. In the case of a fade-in: x(0)=1 and x(N)=0. In the case of a fade-out: x(0)=0 and x(N)=1. It follows that the variation in the luminance level between images n and n+1 is equal to:

$$L_e(n+1) - L_e(n) = \Delta L_s(n+1) * \left(1 - k_1 - k_2\frac{n}{N}\right) - \frac{k_2}{N} * (L_s(n+1) - L_f)$$

The variation in the luminance level between two successive images (or frames) of the sequence s is generally negligible with respect to the luminance variation between the sequence s and the sequence f, thereby making it possible to simplify the equation above as follows:

$$L_e(n+1) - Le(n) \approx -\frac{k_2}{N} * (L_s(n+1) - L_f)$$

By making the assumption of the stationnarity of the luminance level along the sequence s, the equation simplifies in the following manner:

$$L_e(n+1) - Le(n) \approx -\frac{k_2}{N} * (L_s - L_f)$$

The latter assumption is valid most of the time insofar as most fades occur on the basis of a sequence of weak motion. Thus during a fade, the variation in the luminance level between two images (or frames) is dependent on the variation in the luminance level between the start and the end of the fade ($L_s$-$L_f$), and is inversely proportional to the duration (N images or frames) of the fade. The method according to the invention is therefore based on the detection of a variation in the luminance level between two successive images. This variation is thereafter compared with an experimentally defined threshold.

According to a preferred embodiment, illustrated by FIG. 1, the method is split up into 4 steps referenced 10 to 13. In this figure, the modules represented are functional units, which may or may not correspond to physically distinguishable units. For example, these modules or some of them may be grouped together in a single component, or constitute functionalities of one and the same software. A contrario, certain modules may possibly be composed of separate physical entities. Hereinafter in the document, to simplify the description the term image is employed to designate either an image composed of two frames or one frame alone.

Step 10 consists in calculating, over a window N images in length, termed the detection window, a luminance level for each image of the detection window and for the image of the sequence which precedes this window. As defined previously, the luminance level of an image is the sum over the whole of the image of the luminance values associated with each of the pixels of this image. A window N images in length is a portion of the sequence comprising N successive images.

Step 11 consists in detecting a fade, for each image of the detection window, by comparing the variation in the luminance level between this image, termed the current image, and the image which precedes it with a threshold. This threshold is a multiple of the size of the image as a number of pixels. For example, it is equal to 1.75 multiplied by the width and by the height of the image as a number of pixels. If the variation in the luminance level is greater than this threshold then a fade is detected for the current image. Depending on whether one is seeking to detect fade-in or fade-out, the variation in the luminance level is calculated differently. Thus, in the case of a fade-in, the variation in the luminance level is equal to the difference between the luminance level of the image preceding the current image and the luminance level of the current image. In the case of a fade-out, the variation in the luminance level is equal to the difference between the luminance level of the current image and the luminance level of the image preceding it. This step makes it possible to detect, for each image of the detection window, fade-ins and fade-outs separately. Advantageously, different thresholds can be defined so as to detect the fade-ins and the fade-outs.

Step 12 consists in deducing the presence of a fade for the detection window on the basis of the detections performed in step 11. More precisely, this step consists in calculating the number of images of the detection window for which a fade has been detected. During this step, the results arising from the previous step for fade-in and fade-out are combined thereby making it possible to detect a fade whether it be a fade-in or fade-out. For this purpose, if a fade-in or fade-out has been detected in step 11 for at least k ($2 \leq k \leq N$) images of the detection window, we deduce therefrom the presence of a fade for the detection window. The length of the detection window is preferably equal to 8 and k is equal to 6. This step in particular makes it possible to avoid determining false fades due to noise, or else to an instability of the brightness in the course of the sequence.

Advantageously, during an optional step 13, the result of the previous step 12 is combined with a local evaluation of the level of motion of the decision window. This makes it possible to avoid overdetections on portions of sequence of images with strong motion that might possibly be wrongly regarded as fade. This level of motion can be provided for example by an image level decision module (for example decision of the frame/image mode of coding, decision of the type of the image I, P, or B . . . ) of a coding device. It can be calculated for an image by computing the ratio between the temporal activity calculated between this image and the image preceding it (for example the sum of the absolute values of the differences, pixel-wise, between the luminance values associated with each pixel of this image and the luminance values associated with each pixel of the image preceding it) and the spatial activity calculated for this image (for example the sum over the image of the absolute values of the luminance values associated with each pixel of this image). More precisely, the level of motion calculated for the last image of the decision window is the level of motion associated with the decision window. If the presence of a fade has been deduced for the detection window at the previous step 12 and if the level of motion for this window is less than a certain threshold, then the presence of a fade for the detection window is validated.

In the particular case of an interlaced sequence, it is advantageous to define a sliding window, termed the decision window. This window can for example have a size of three frames. This window shown in FIG. 2 can in particular be used, in a coding device, by an image level decision module. In FIG. 2, the window is positioned so as to take an image level decision for the image referenced $P_k$ corresponding to the frames referenced $F_{i-1}$ and $F_{i-2}$. More precisely, the image $P_k$ is either an image consisting of the union of the two frames $F_{i-1}$ and $F_{i-2}$ ("frame picture"), or an image consisting of two independent frames $F_{i-1}$ and $F_{i-2}$ ("field picture"). In the case of the MPEG-2 standard defined in the document ISO/IEC 13818-2 (entitled "Information technology—Generic coding of moving pictures and associated audio information: Video"), the image level decisions (for example decision of the "frame picture"/"field picture" mode of coding, decision of the type of the image I, P, or B . . . ) apply at least over two successive frames. In the particular case of a sequence having undergone a transformation of 24-image adjustment type ("detelecine" or "3:2 pulldown"), a frame is repeated. The size of the decision window is therefore three frames. In order to tie the fade detection to the image level decisions, the variation in the level of luminance calculated in step 11, is calculated between the frame positioned in $F_{i-1}$ in the sliding window and the frame at the same position in the sliding window such as positioned so as to take an image level decision for the preceding image referenced $P_{k-1}$. FIGS. 3 and 4 represent the position of the decision window for the following image $P_{k+1}$. Specifically, if $P_k$ is composed of the union of $F_{i-1}$ and $F_{i-2}$ and if $F_i$ is not a repeated frame or if $P_k$ is composed of two independent frames $F_{i-1}$ and $F_{i-2}$, then the following position of the decision window for the image $P_{k+1}$ is illustrated by FIG. 3. On the other hand, if $P_k$ is composed of the union of $F_{i-1}$ and $F_{i-2}$ and if $F_i$ is a repeated frame ("detelecine" case), then the following position of the decision window for the image $P_{k+1}$ is illustrated by FIG. 4.

The present invention also relates to a device for detecting fades, referenced 30 in FIG. 5, implementing the method described previously. Only the essential elements of the device are represented in FIG. 5. The device 30 comprises: a random access memory 32 (RAM or similar component), a read only memory 33 (hard disk or similar component), a processing unit 34 such as a microprocessor or a similar component and an input/output interface 35. These elements are linked together by an address and data bus 31. The read only memory 33 contains the algorithms implementing steps 10 to 12 and optionally step 13 of the method according to the invention. On power-up, the processing unit 34 loads and executes the instructions of these algorithms. The random access memory 32 in particular comprises the programs for operating the processing unit 34 loaded on power-up of the appliance, as well as the images to be processed. The input/output interface 35 has the function of receiving the input signal (i.e. the source image sequence) and outputs the result of the fade detection according to steps 10 to 12 (or 13) of the method of the invention.

The present invention applies to the field of image sequence compression. Specifically, the device for detecting fades 30 can be used in a coding device referenced 40 in FIG. 6. This device comprises in particular coding means 41 for coding the source image sequence 400. The coding means comprise at least decision means making it possible to select the type of image (e.g. intra (I image), predicted (P images), bidirectional (B images)). This module can for example implement the MPEG-2 coding standard defined in particular in the document ISO/IEC 13818-2 (entitled "Information technology—Generic coding of moving pictures and associated audio information: Video"). More generally, it can implement any standard for coding image sequences. In particular it uses the information provided by the device 30 to dynamically adapt the type of image. This can make it possible to improve the cost of compression and the quality of the decoded images.

The device for detecting fades 30 can also be integrated with a device for structuring image sequences, referenced 50 in FIG. 5. This device 50 comprises in particular indexation means 51 making it possible to create a description 501 of the source image sequence 400 (e.g. temporal marker, otherwise known as a "time code", of start and end of fades). This device 50 in particular makes it possible to retrieve the shot boundaries and narrative units so as to make it possible to navigate non-linearly through the sequence or to generate digests.

More precisely, it makes it possible to retrieve the appropriate shot boundaries when a fade has been introduced during editing by virtue of the device for detecting fades 30 and therefore provides better bases for structuring into narrative units. Moreover the knowledge of the fades gives high-level information on the structuring of the video. The device 50 therefore makes it possible to structure the sequence for example into chapters and sub-chapters in the case of digital sequences of images as on a DVD. Specifically, in a film, a fade to black or fade-out followed by a fade from black or fade-in very often indicates a change of "chapter". Moreover, in the sports retransmissions, slow motions—which make it possible to detect the interesting phases of a game—are very often delimited by fades.

Of course, the invention is not limited to the exemplary embodiments mentioned above. In particular, the person skilled in the art can introduce any variant to the embodiments set forth and combine them to benefit from their various advantages.

The invention claimed is:

1. A method for detecting a fade in a sequence of images, said images comprising pixels or image points with each of which is associated at least one luminance value, said method comprising the following steps:
    calculating, for each of the images of a window N consecutive images in length, termed detection window, and for the image preceding said detection window, a luminance level on the basis of the luminance values associated with each of said pixels of each of said images;
    calculating, for each of said N images of said detection window, a difference of luminance level between the luminance level of the current image and the luminance level of the image preceding said current image; and
    deducing therefrom the presence of a fade for said detection window if, for at least k images of said detection window, said difference of luminance level is greater than a predefined threshold, with $2 \leq k \leq N$.

2. A method according to claim 1, wherein the luminance level of an image is equal to the sum of the luminance values of each of said pixels of said image.

3. A method according to claim 1, that it comprising an additional step for validating the presence of a fade in the detection window if a level of motion associated with said detection window is less than a predetermined threshold.

4. A method according to claim 3, wherein the level of motion associated with an image is equal to the ratio between the temporal activity calculated between said image and the image preceding said image, termed the preceding image, and the spatial activity calculated for said image and in that the level of motion associated with said detection window is equal to the level of motion associated with the last image of said detection window.

5. A method according to claim 4, wherein said temporal activity between said image and said preceding image is equal to the sum of the absolute values of the pixel-wise differences between the luminance values associated with each pixel of said image and the luminance values associated with each pixel of said preceding image and in that the spatial activity of said image is equal to the sum of the absolute values of the luminance values associated with each pixel of said image.

6. A device for detecting fades in a sequence of images comprising pixels or image points with each of which is associated at least one luminance value, wherein it comprises:
    means of calculation for calculating, for each of the images of a window N consecutive images in length, termed the detection window, and for the image preceding said detection window, a luminance level on the basis of the luminance values associated with each of said pixels of each of said images;
    means of calculation for calculating, for each of said N images of said detection window, a difference of luminance level between the luminance level of the current image and the luminance level of the image preceding said current image; and
    means for deducing the presence of a fade for said detection window if for at least k images of said detection window said difference of luminance level is greater than a predefined threshold, with $2 \leq k \leq N$.

7. A video coding device, comprising coding means and a device for detecting fades according to claim 6.

8. A device for structuring a sequence of images, comprising indexation means and a device for detecting fades according to claim 6.

* * * * *